United States Patent [19]
Takatsuka et al.

[11] Patent Number: 5,304,234
[45] Date of Patent: Apr. 19, 1994

[54] GAS SEPARATION PROCESS AND UNIT THEREFOR

[75] Inventors: Toru Takatsuka; Ryuichiro Kajiyama; Yoshimi Okada; Seiya Hirohama, all of Kanagawa; Tetsuo Shibagaki; Toshio Kushida, both of Toyama, all of Japan

[73] Assignee: Chiyoda Corporation, Kanagawa, Japan

[21] Appl. No.: 937,107

[22] Filed: Aug. 31, 1992

[30] Foreign Application Priority Data

Aug. 30, 1991 [JP] Japan .................. 3-220371

[51] Int. Cl.⁵ ............................................. B01D 53/08
[52] U.S. Cl. ........................................ 95/106; 95/111; 95/139; 96/123; 96/126; 96/150
[58] Field of Search ............... 55/34, 58, 60, 62, 68, 55/77, 79, 181, 208, 390

[56] References Cited

U.S. PATENT DOCUMENTS

| | | | |
|---|---|---|---|
| 1,702,311 | 2/1929 | Pantenburg | 55/58 |
| 2,568,396 | 9/1951 | James | 55/79 X |
| 2,583,239 | 1/1952 | Teter | 55/79 |
| 2,594,615 | 4/1952 | Berg | 55/58 |
| 2,684,931 | 7/1954 | Berg | 55/79 X |
| 2,702,826 | 2/1955 | Kirshenbaum et al. | 55/79 X |
| 3,007,545 | 11/1961 | Kimberlin, Jr. et al. | 55/77 X |
| 3,037,338 | 6/1962 | Thomas | 55/58 |
| 3,093,465 | 6/1963 | Latta | 55/34 X |
| 3,266,221 | 8/1966 | Avery | 55/58 |
| 3,727,376 | 4/1973 | Szirmay | 55/60 |
| 5,110,323 | 5/1992 | Soni | 55/79 X |

FOREIGN PATENT DOCUMENTS

| | | | |
|---|---|---|---|
| 54-100976 | 8/1979 | Japan | 55/181 |
| 2018153 | 10/1979 | United Kingdom | 55/79 |

Primary Examiner—Robert Spitzer
Attorney, Agent, or Firm—Sughrue, Mion, Zinn, Macpeak & Seas

[57] ABSTRACT

A gas separation process and a unit therefor. The process comprises the steps of: introducing a gas consisting of two or more components into an adsorption system in which adsorbent particles circulate in a fluidized state, thereby to allow, at atmospheric pressure or an elevated pressure, the adsorbent particles to adsorb a gas component to be separated from the gas; transferring the adsorbent particles adsorbing the gas component to a desorption system; and then desorbing the gas component from the adsorbent particles in the desorption system which is regulated to have either a lower pressure or a lower pressure and a higher temperature than the adsorption system.

10 Claims, 9 Drawing Sheets

GAS SEPARATION PROCESS AND UNIT THEREFOR

FIELD OF THE INVENTION

The present invention relates to a gas separation process for separating a particular component by adsorption from a gas consisting of two or more components and to a gas separation unit for practicing the process. Specifically, the present invention relates to a gas separation process and unit in which fluidized adsorbent particles circulate through an adsorption system and a desorption system.

BACKGROUND OF THE INVENTION

Conventionally known gas separation methods include, for example, (i) chemical absorption method, (ii) cryogenic separation method, and (iii) adsorption method. Although these methods have been widely used, each has merits and demerits and therefore, has been employed in fields for which the method is suited.

The chemical absorption method (i) has been used for the removal of hydrogen sulfide or carbon dioxide gas and has also been put to trial use for the desulfurization of exhaust gases. However, this method is defective in that in the case of using an organic compound as an absorbent, there are problems in treatment of waste fluid, treatment of harmful substances resulting from decomposition of the absorbent, etc., and that in the case where an acidic gas is treated using a hot aqueous alkali solution as an absorbent, the consumption of heat energy is large.

The cryogenic separation method (ii) has been used, for example, for the separation of air and the separation of hydrocarbon gases such as natural gas. However, this method is disadvantageous in that a large-sized freezing equipment is required and this method is costly. Therefore, practical use of the cryogenic separation method is limited to applications in which separation by the other methods is difficult.

The adsorption method (iii) has been extensively used because it is simple and the unit used therefor can have a size ranging from a small to a relatively large one. Known types of units for this method include fixed bed type and fluidized bed type.

In adsorption, the amount of a gas adsorbed onto an adsorbent becomes larger with increasing pressure and decreasing temperature, and becomes smaller with reducing pressure and increasing temperature. The adsorption method utilizes this phenomenon in conducting the adsorption step where a gas is adsorbed onto an adsorbent and the desorption step where the adsorbed gas is desorbed from the adsorbent. Adsorption separation units of the fixed bed type can utilize the above phenomenon by being provided with a means for changing pressure and temperature. However, in the case of adsorption separation units of the conventional fluidized bed type in which fluidized adsorbent particles circulate in the unit, a pressure difference is rarely utilized in the adsorption-desorption operation although a slight pressure is applied as a driving force for circulating adsorbent particles, from the standpoints of smooth migration of adsorbent particles between the desorption part and the adsorption part. For these reasons, the adsorption-desorption operation in the conventional units of the fluidized bed type utilizes a temperature difference only. In the case of adsorption separation units of the fixed bed type, since a larger bed height results in an increased pressure loss, the area of the adsorbent bed should be increased, or the whole unit should be enlarged, in order to heighten treating capacity. However, the possible unit size is limited. Furthermore, size increase of switch valves is also limited.

With a recent increase in the amount of chemical products produced in a single plant in the chemical industry or the like, the amount of gases to be treated by gas separation has become large. Therefore, there is a need of developing an adsorption method capable of coping with such recent large amount gas separation treatment.

Studies have recently been made of the separation and fixation of carbon dioxide gas present in fossil fuel-combustion gases as one means for preventing the earth from warming up due to carbon dioxide gas, and it has been proposed to use an adsorption unit of the fixed bed type for the carbon dioxide gas separation. However, in such carbon dioxide gas separations from combustion gases including exhaust gases discharged from thermal power stations, an enormous amount of gas should be treated and treating operation is required to be conducted continuously using an exceedingly large-sized unit. Treatment of such a large amount of gas using a fixed bed type unit is, therefore, difficult because of the limitations on adsorbent bed thickness and on size increase of switch valves as described above.

SUMMARY OF THE INVENTION

An object of the present invention is to provide a process and unit for gas separation by adsorption, in which a large amount of gas can be treated to separate a particular gas component and the separation operation can be conducted continuously.

Another object of the present invention is to provide a process and unit for gas separation, in which the largest possible difference in gas adsorbability due to a difference in each of pressure and temperature between adsorption and desorption can be utilized in the circulation of fluidized adsorbent particles, thereby enabling treatment of a large amount of gas.

Other objects and effects of the present invention will be apparent from the following description.

The present invention relates to, in one aspect, a gas separation process which comprises the steps of: introducing a gas consisting of two or more components into an adsorption system in which adsorbent particles circulate in a fluidized state, thereby to allow, at atmospheric pressure or an elevated pressure, the adsorbent particles to adsorb a gas component to be separated from the gas; transferring the adsorbent particles adsorbing the gas component to a desorption system; and then desorbing the gas component from the adsorbent particles in the desorption system which is regulated to have either a lower pressure or a lower pressure and a higher temperature than the adsorption system.

The present invention also relates to, in another aspect, a process for separating carbon dioxide gas which comprises the steps of: introducing a carbon dioxide gas-containing gas into a system in which adsorbent particles circulate in a fluidized state, thereby to allow the adsorbent particles to adsorb carbon dioxide gas at a pressure of from 1 to 2 atm; separating the residual gas remaining unadsorbed from the adsorbent particles; and then desorbing the carbon dioxide gas from the adsorbent particles at a pressure of from 20 to 760 mmHg.

The present invention also relates to, in further aspect, a gas separation unit for separating a gas component from a gas consisting of two or more components, the unit comprising a gas adsorption system and a gas desorption system, the gas adsorption system comprising an adsorption part into which a gas consisting of two or more components is introduced and in which adsorbent particles move in a fluidized state; a cyclone which has been connected with the adsorption part and into which the gas and the adsorbent particles flow for separation; a transfer piping for sending the adsorbent particles from the cyclone to a desorption part of the gas desorption system; and a discharge piping provided in the cyclone and for discharging a residual gas that has undergone adsorption treatment, the gas desorption system comprising a desorption part which is regulated to have a lower pressure than the adsorption part and in which the adsorbent particles move in a fluidized state; a cyclone which has been connected with the desorption part and into which a desorbed gas and the adsorbent particles flow; a transfer piping for sending the adsorbent particles thus-regenerated from the cyclone to the adsorption part; and a discharge piping provided in the cyclone and for discharging the separated gas.

DESCRIPTION OF THE PREFERRED EMBODIMENTS

Figure 1:
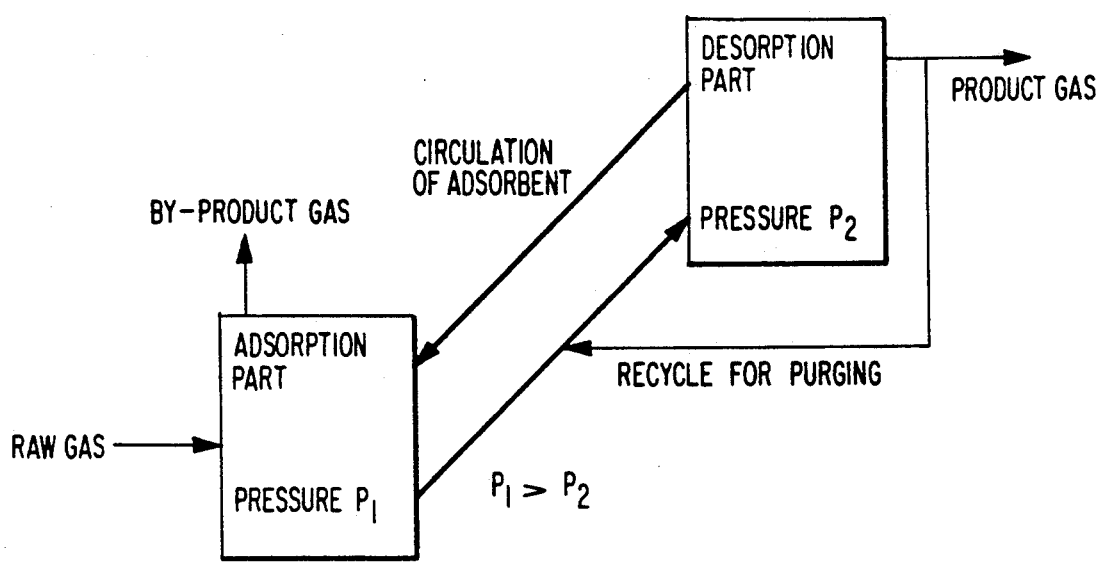
FIG. 1 is a diagram illustrating the concept of the present invention.

For a better understanding of the present invention, the concept of the present invention is illustrated in FIG. 1.

In the process of the present invention, a gas consisting of two or more components is introduced into an adsorption part of a system in which fluidized adsorbent particles circulate, thereby to allow the adsorbent to preferentially adsorb a gas component to be separated and recovered, and the adsorbed gas component is then desorbed from the adsorbent in a desorption part having either a lower pressure or a lower pressure and a higher temperature than the adsorption part. The resulting adsorbent is transferred from the low-pressure part to the high-pressure part and reused.

In obtaining a separated gas component having an improved purity, it is effective to introduce part of the desorbed gas component as a recycle gas into a line for transferring adsorbent particles from the adsorption part to the desorption part.

Figure 2:
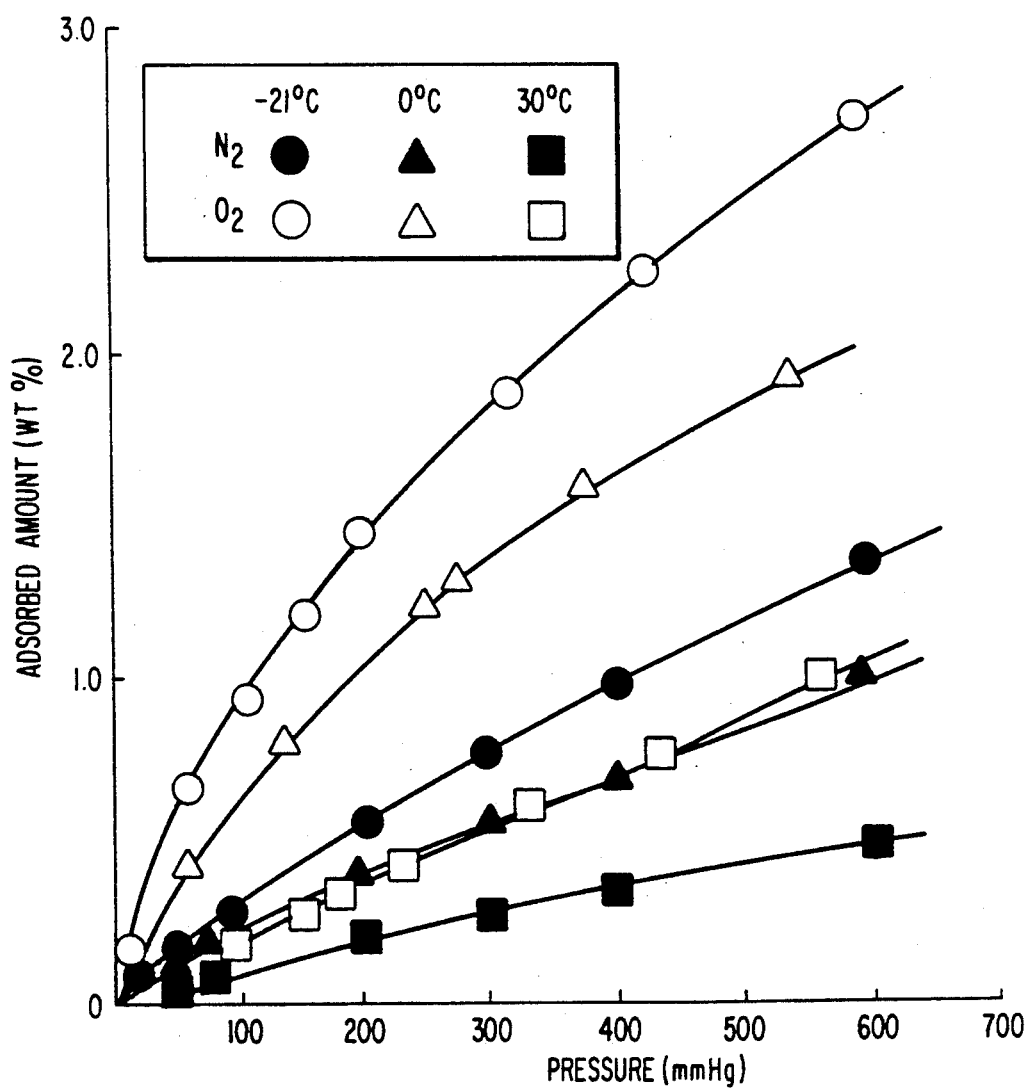
FIG. 2 is a graph showing adsorption isotherms for adsorption of nitrogen and oxygen on BPL activated carbon.
Figure 3:
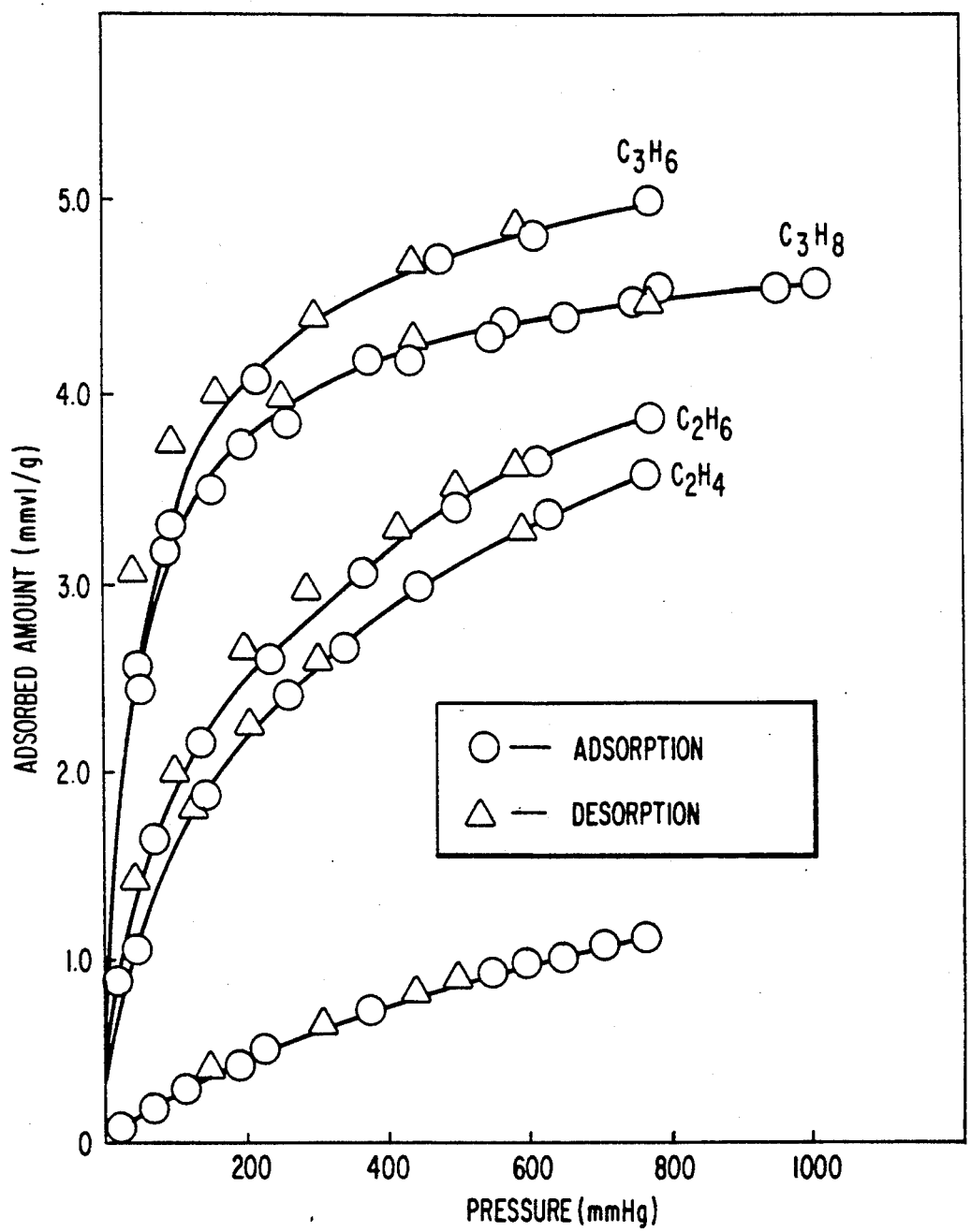
FIG. 3 is a graph showing adsorption isotherms for adsorption of lower hydrocarbons on Columbia activated carbon at 25° C.
Figure 4:
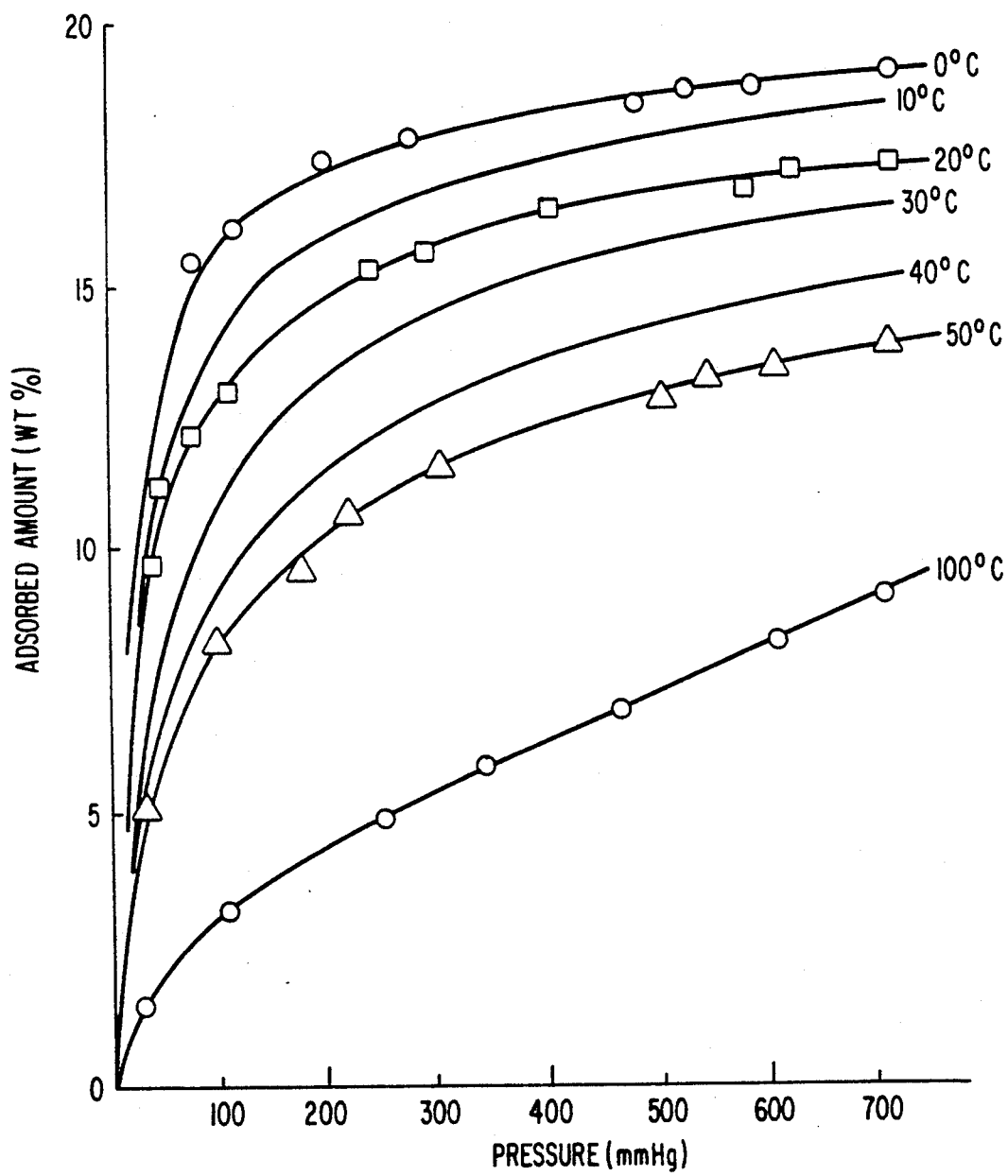
FIG. 4 is a graph showing adsorption isotherms for adsorption of carbon dioxide gas on a zeolite.

Some examples of the relationship between adsorbed amount and temperature/pressure are shown in FIGS. 2, 3, and 4. FIG. 2 is a graph showing adsorption isotherms for the adsorption of nitrogen and oxygen on BPL activated carbon; FIG. 3 is a graph showing adsorption isotherms for the adsorption of lower hydrocarbons on Columbia activated carbon at 25° C.; and FIG. 4 is a graph showing adsorption isotherms for the adsorption of carbon dioxide gas on a zeolite of MS13X type. As shown in these figures, the amount of an adsorbed gas becomes larger, as the temperature becomes lower and the pressure becomes higher.

Figure 5:
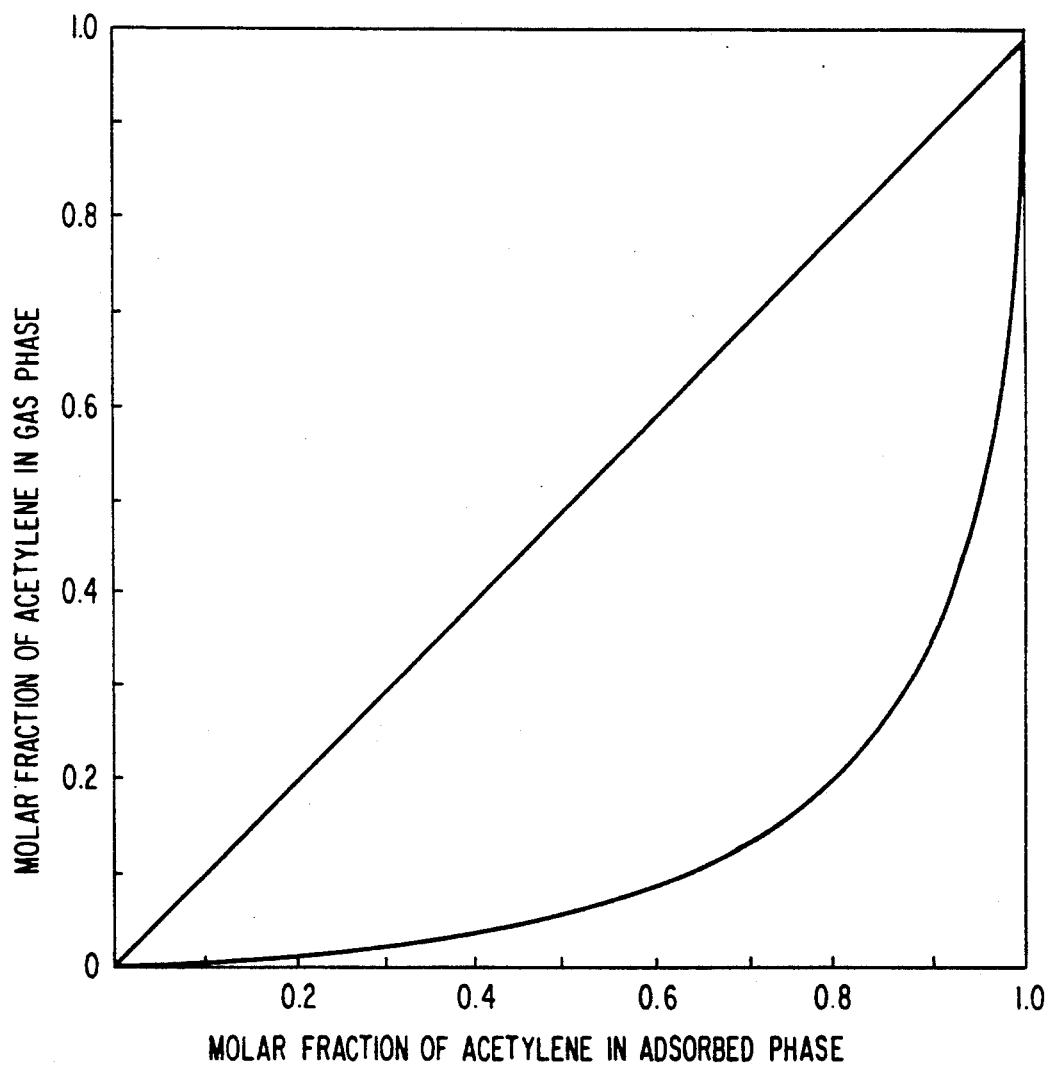
FIG. 5 is an X-Y plot for adsorption of ethylene-acetylene mixtures.
Figure 6:
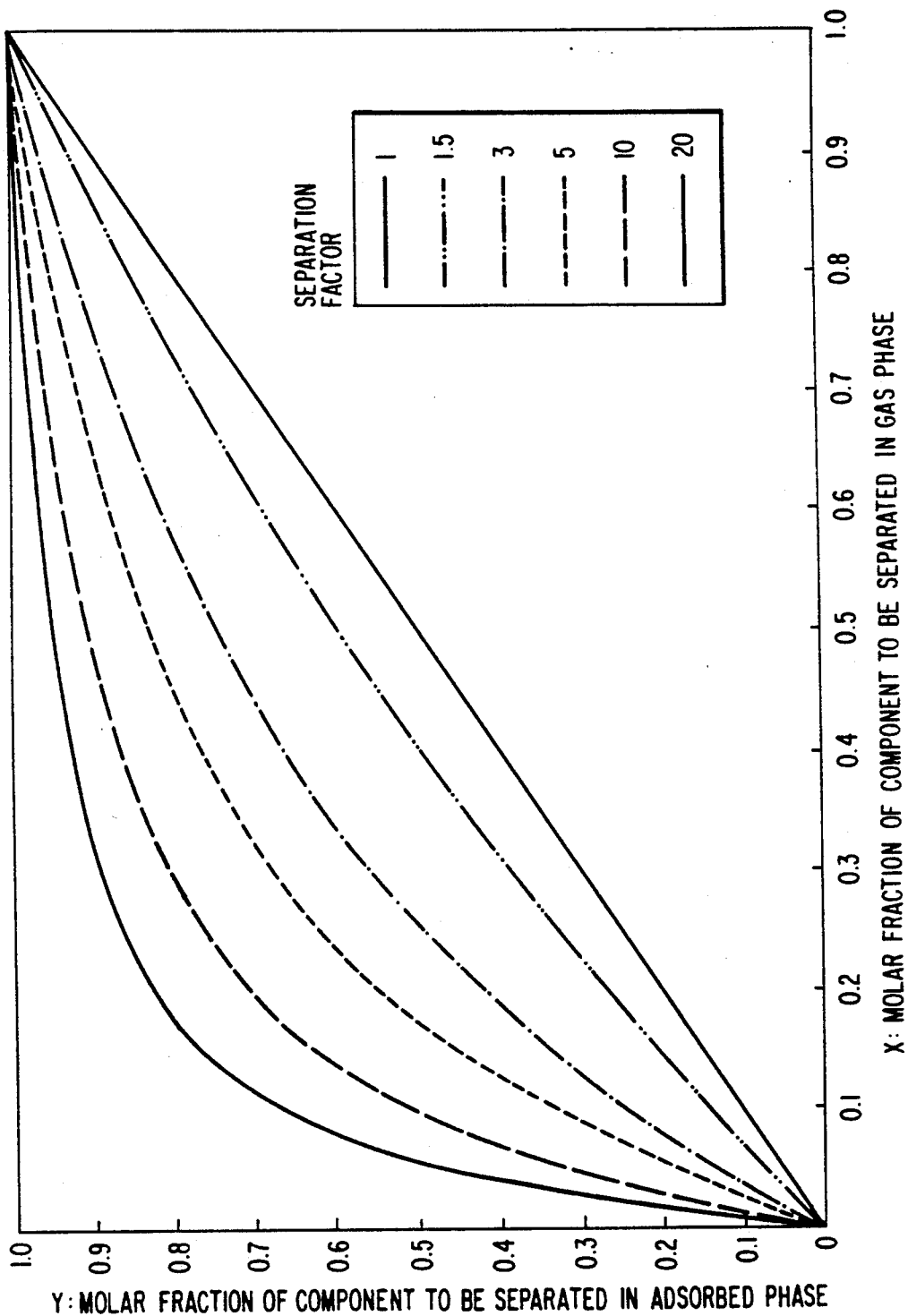
FIG. 6 is a graph showing the effect of separation factor on X-Y plots.

One aspect of the adsorption characteristics of a two-component gas is given in FIG. 5, which shows an X-Y plot for the adsorption of ethylene-acetylene mixtures on a zeolite. Further, change of adsorption characteristics with changing separation factor is illustrated in FIG. 6, which is a graph showing the effect of separation factor on X-Y plots. As apparent from FIG. 6, the larger the separation factor for the component to be separated with respect to the other components, the more preferentially the component to be separated is adsorbed on the adsorbent. FIGS. 2, 3 and 5 are disclosed in T. Kawai, *Atsuryoku Swing Kyuchaku Gijutsu Shusei* (Compilation of Pressure Swing Adsorption Techniques), published by Kogyo Gijutsu-kai on Jan. 15, 1986, and FIG. 4 is disclosed in T. Kawai, *Tansan Gas Kaishu Gijutsu* (Carbon Dioxide Gas Recovery Techniques), published by N.T.S. on Sep. 1, 1991.

The value of separation factor for the component to be separated with respect to the other components is preferably 3 or larger, because if the separation factor is too small, the proportion of a gas that should be recycled for attaining improved product purity should be increased.

Due to the positive utilization of these adsorption characteristics, the process of the present invention can be applied to gas separations in a variety of fields such as the separation of carbon dioxide gas from exhaust combustion gases, purification of natural gas, separation of lower hydrocarbons, air separation, removal of harmful gases, and solvent recovery, but the fields to which the present invention can be applied are not limited thereto.

The adsorbent used in the present invention is not particularly limited and includes the adsorbents presently used in general, such as activated carbons and zeolites, and other adsorbent which has a separation factor in the above-specified range for a gas to be treated.

The ranges of temperature and pressure conditions for the adsorption part and for the desorption part and the proper range of the amount of adsorbent particles to be circulated depend on one another. Upon determining these conditions, the desired recovery and purity of a product gas to be produced and the energy cost should be taken in account. For a simplification of explanation on the above, the adsorption of a single-component gas as shown in FIG. 4 is taken as an example. In this system, almost the same recovery can be obtained in (a) an operation in which the adsorption part is regulated at 100° C./760 mmHg and the desorption part at 100° C./200 mmHg, (b) an operation in which the adsorption part is regulated at 50° C./760 mmHg and the desorption part at 100° C./700 mmHg, and (c) an operation in which the adsorption part is regulated at 100° C./760 mmHg and the desorption part at 100° C./450 mmHg with the amount of adsorbent particles circulated being two times that for the above two operations (a) and (b). The values of pressure referred herein are shown in terms of absolute pressure, except for the pressure differences.

The pressure in the desorption system is preferably a reduced pressure. The transfer of adsorbent particles from the desorption part having a lower pressure to the adsorption part having a higher pressure can be attained by constructing the separation unit in such a manner that the transfer piping through which adsorbent particles descend from the desorption part to the adsorption part has such a piping length that the adsorbent particle bed in the piping produces a static pressure difference larger than the pressure difference between the desorption and adsorption parts. If the pressure difference between the adsorption and desorption parts is too large, the unit needs to have an unpractical height. If the pressure difference is too small, this pressure difference is used only for compensation for a pressure loss caused by transfer of adsorbent particles and does not contribute to an improvement in adsorption. Therefore, the pressure difference between the adsorption part and the desorption part is preferably from 200 mmHg to 2 atm.

In the case of increasing the amount of a gas to be treated, this can basically be coped with by increasing the diameter of each piping to thereby increase the amount of adsorbent particles circulated.

The gas separation unit for practicing the gas separation process of the present invention is an unit which is for separating a gas component from a gas consisting of two or more components and comprises a gas adsorption system and a gas desorption system.

The gas adsorption system comprises: an adsorption part into which a gas consisting of two or more components is introduced and in which adsorbent particles move in a fluidized state; a cyclone which has been connected with the adsorption part and into which the gas and the adsorbent particles flow for separation; a transfer piping for sending the adsorbent particles from the cyclone to a desorption part of the gas desorption system; and a discharge piping provided in the cyclone and for discharging a residual gas that has undergone adsorption treatment.

The gas desorption system comprises: a desorption part which is regulated to have a lower pressure than the adsorption part and in which the adsorbent particles move in a fluidized state; a cyclone which has been connected with the desorption part and into which a desorbed gas and the adsorbent particles are to flow; a transfer piping for sending the adsorbent particles thus-regenerated from the cyclone to the adsorption part; and a discharge piping provided in the cyclone and for discharging the separated gas.

The gas separation unit according to the present invention is described in detail below by referring to embodiments shown in FIGS. 7 to 9, but the present invention is not construed as being limited thereto.

Figure 7:
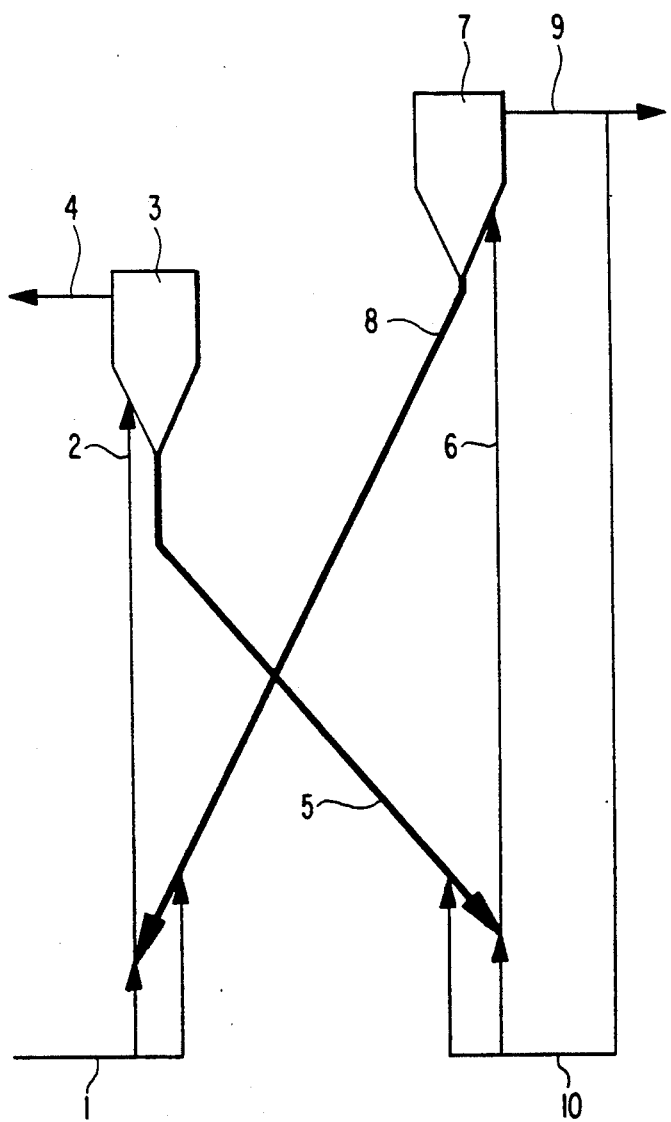
FIG. 7 is a diagrammatic view illustrating one embodiment of the gas separation unit according to the present invention.

FIG. 7 shows one embodiment of the gas separation unit according to the present invention. The unit of FIG. 7 is of the type in which the adsorption part and the desorption part each is tubular and adsorbent particles in a fluidized state ascend through the tubular parts. An example of the separation operation using this unit is illustrated below. A pressurized raw gas 1 is introduced from the lower end of an adsorption-part riser 2, and ascends through the riser 2 while fluidizing adsorbent particles fed from an adsorption-part stand pipe 8. During the ascent of the raw gas and the adsorbent particles, a component of the raw gas is adsorbed onto the adsorbent particles. The resulting mixture of gas and adsorbent particles enter a cyclone 3 and are separated to each other therein. A by-product gas 4 resulting from the separation is discharged from the cyclone 3, while the adsorbent particles having a gas component adsorbed thereon are sent from the lower end of the cyclone 3 through a purge-part stand pipe 5 to the lower end of a desorption-part riser 6. The pressure in the desorption-part riser 6 is regulated at a value sufficiently lower than the pressure in the adsorption-part riser 2 by evacuating a cyclone 7 on the upper end of the desorption-part riser 6 through a gas discharge pipe extending from the cyclone 7. Due to the reduced pressure in the desorption-part riser 6, the adsorbed gas component is desorbed from the adsorbent particles in the riser 6. The desorbed gas flows upward in the riser 6 to fluidize the adsorbent particles. If the desorbed gas is insufficient to fluidize the adsorbent particles and to make them ascend, a part of a product gas 9 may be taken out and fed to the riser 6 from the lower end thereof. It is also possible to further take out part of the separated product gas and feed it to the purge-part stand pipe 5 as a recycle gas 10 for purging.

The gas and adsorbent particles that have ascended through the desorption-part riser 6 enter the cyclone 7 and are separated to each other therein. The gas separated from the adsorbent particles is withdrawn as a product gas 9, while the adsorbent particles from which the product gas 9 has been desorbed are returned from the lower end of the cyclone 7 through the adsorption-part stand pipe 8 to the adsorption-part riser 2 and reused while being circulated as described above.

In this unit, while the desorption-part riser 6 has a lower pressure than the adsorption-part riser 2, the gas within the adsorption-part riser 2 does never flow in the opposite direction through the adsorption-part stand pipe 8 and the cyclone 7, because of pressure, resistance and the like caused by the weight of the adsorbent particles present in the stand pipe 8. In reducing the pressure in the desorption-part riser 6 to a value lower than the pressure in the adsorption-part riser 2, it is advantageous to regulate the pressure in the riser 6 at a reduced pressure below atmospheric pressure because a large pressure difference can be obtained between the risers 6 and 2 and, hence, the adsorption-desorption operation can be conducted more effectively. Even at such a reduced pressure, the fluidized state of the adsorbent particles in the desorption part is maintained satisfactorily.

Figure 8:
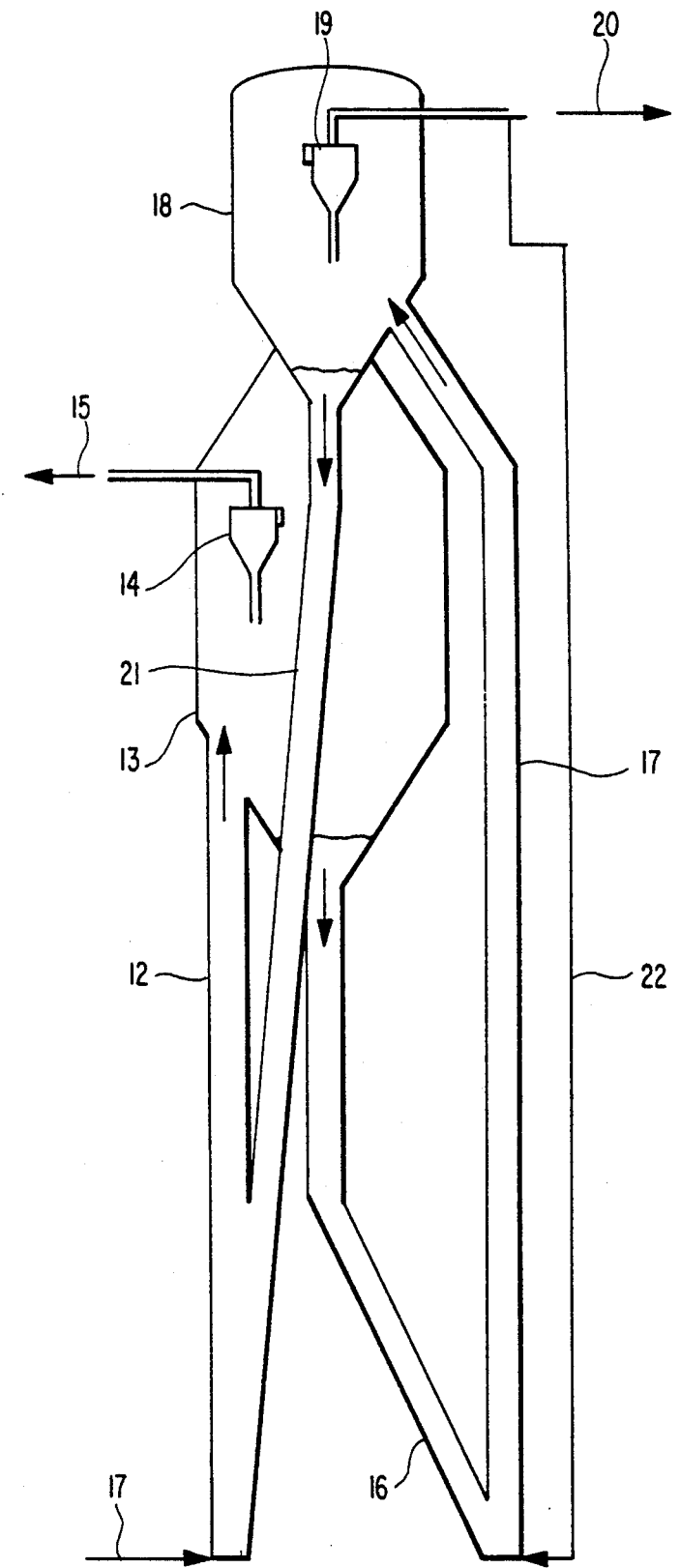
FIG. 8 is a diagrammatic view illustrating another embodiment of the gas separation unit according to the present invention.

Another embodiment of the gas separation unit according to the present invention is shown in FIG. 8. In this unit, the adsorption part comprises an adsorption-part riser 12 and an adsorption tower 13, and the desorption part comprises a desorption-part riser 17 and a desorption tower 18. The adsorption tower 13 and the desorption tower 18 each may have a bed of fluidized adsorbent particles, and contain therein cyclones 14 and 19, respectively. The adsorption tower 13 and the desorption tower 18 have such constructions that the adsorbent particles separated from gas in the cyclones 14 and 19 fall to the lower parts of the adsorption tower 13 and the desorption tower 18, and then enter a purge-part stand pipe 16 and an adsorption-part stand pipe 21, respectively. The pipe for feeding raw gas 11 is connected to adsorption-part riser 12. Cyclone 14 is connected to piping fordischarging discharging by-product gas 15. Cyclone 19 is connected to piping for discharging product gas 20, which in turn is connected to piping for feeding recycle gas for purging 22, which in turn is connected to purge-part stand pipe 16. Except the above, the flows of gases and adsorbent particles may be the same as those in the unit of FIG. 7.

The present invention can be used for the separation of a particular gas component from various kinds of gases consisting of two or more components, such as the gaseous mixtures the adsorption of which is shown in FIGS. 2 to 5. That is, the invention is applicable, for example, to the separation of oxygen and nitrogen, separation of lower hydrocarbons, and separation of carbon dioxide gas from exhaust combustion gases. Of these, the present invention is particularly suited for the separation of carbon dioxide gas from carbon dioxide gas-containing gases.

A separation unit for separating carbon dioxide gas, according to the present invention, is explained below with reference to FIG. 9.

Figure 9:
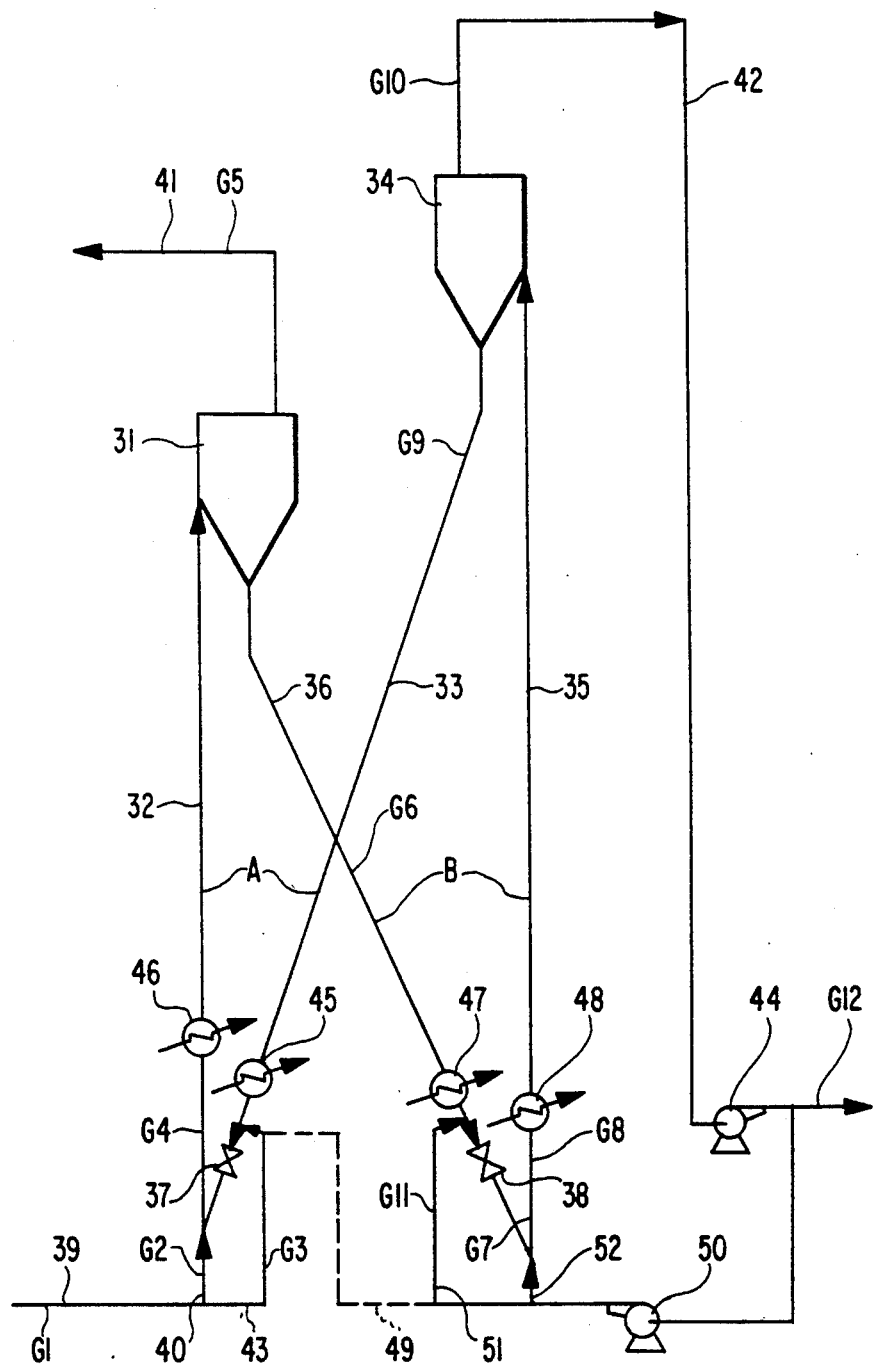
FIG. 9 is a diagrammatic view illustrating one embodiment of the carbon dioxide gas separation unit according to the present invention.

The carbon dioxide gas separation unit as shown in FIG. 9 comprises a carbon dioxide gas adsorption system A and a carbon dioxide gas desorption system B. The carbon dioxide gas adsorption system A and the carbon dioxide gas desorption system B each comprises a cyclone, a piping which extends to the cyclone and functions as an adsorption or desorption part, and a piping extending from the cyclone.

Illustratively stated, the carbon dioxide gas adsorption system A comprises a cyclone 31, an adsorption-part riser 32 extending to the cyclone 31, and an adsorption-part stand pipe 33, while the carbon dioxide gas desorption system B comprises a cyclone 34, a desorption-part riser 35 extending to the cyclone 34, and a purge-part stand pipe 36.

The carbon dioxide gas adsorption system A and the carbon dioxide gas desorption system B are united with each other by connecting the purge-part stand pipe 36 and the desorption-part riser 35, which lead to the cyclone 34 of the carbon dioxide gas desorption system B, to the cyclone 31 of the carbon dioxide gas adsorption system A, and connecting the adsorption-part stand pipe 33 and the adsorption-part riser 32, which lead to the cyclone 31 of the adsorption system A, to the cyclone 34 of the desorption system B, thereby to establish a circuit for zeolite adsorbent particles. In this circuit, adsorbent particles circulate from the adsorption-part stand pipe 33 through the adsorption-part riser 32, the cyclone 31, the purge-part stand pipe 36, and the desorption-part riser 35 to the cyclone 34, and again to the adsorption-part stand pipe 33.

The unit of FIG. 9 is provided with a valve 37 between the adsorption-part stand pipe 33 and the adsorption-part riser 32 and with a valve 38 between the desorption purge-part stand pipe 36 and the desorption-part riser 35. Hereinafter, "adsorption-part stand pipe 33" is simply referred to as "pipe 33", and the other stand pipe, the risers, and so forth are also referred to likewise.

A feed piping 39 for feeding a carbon dioxide gas-containing dry gas is connected to a piping 40 and a piping 43 which are connected to the riser 32 and the pipe 33, respectively. The cyclone 31 is provided with a discharge piping 41 for discharging an unadsorbed gas, and the cyclone 34 is provided with a withdrawal piping 42 for taking out separated carbon dioxide gas desorbed from adsorbent particles.

The above carbon dioxide gas separation unit according to the present invention will be further explained below with respect to its operation.

In the case where the carbon dioxide gas-containing gas to be treated is an exhaust combustion gas as in the Example given later, the exhaust gas usually contains from 5 to 15% of water. If such an exhaust gas is treated as it is, the water contained therein is adsorbed very strongly onto a zeolite, which will be described later, in the carbon dioxide gas separation unit to weaken the carbon dioxide gas-adsorbing ability of the zeolite. For the purpose of preventing a reduction of carbon dioxide gas adsorbing capacity in the case of treating such a carbon dioxide gas-containing gas having a high water content, the zeolite particles may be required to be partly taken out and replaced with fresh ones in an amount larger than the amount of crushed or worn-out particles. Therefore, in this embodiment, the carbon dioxide gas-containing gas to be treated is dried beforehand and the dry gas containing carbon dioxide gas is then regulated to have a temperature of 50° C. or less and a pressure of from 1 to 2 atm (absolute pressure) before being fed to the carbon dioxide gas separation unit of the present invention.

For the drying of a carbon dioxide gas-containing gas, a conventional drying unit may be used. For example, a combination of a pressurizing with cooling device and, for high-degree of drying, a dehydrator employing a dehydrating adsorbent or water separation membrane may be used. This drying unit will be explained later.

A carbon dioxide gas-containing gas (raw gas) which has been dried is fed through the feed piping 39 and the piping 40 to the riser 32 extending to the cyclone 31 of the carbon dioxide gas adsorption system and also fed through the piping 43 to the pipe 33, respectively. Zeolite adsorbent particles in a fluidized state circulate through the circuit described above, i.e., from the pipe 33 through the riser 32, the cyclone 31, the pipe 36, and the riser 35 to the cyclone 34 and again to the pipe 33. Hence, the carbon dioxide gas contained in the dry raw gas is adsorbed onto the zeolite adsorbent particles in the pipe 33 and in the riser 32 of the adsorption system. After purging the other gas components than carbon dioxide by the recycled gas in the pipe 36, the adsorbed carbon dioxide gas is desorbed from the adsorbent in the riser 35, and then separated from the adsorbent in the cyclone 34. The separated carbon dioxide gas is recovered by means of a piping 42 and a pump 44. A vacuum pump is generally employed as the pump 44 in order to enable the desorption system B to be evacuated.

An off-gas (by-product gas) resulting from carbon dioxide gas separation, which mainly composed of nitrogen gas, is discharged from the unit by taking out from the cyclone 31 through the piping 41. In the unit of FIG. 9, the piping 33 and the riser 32 are provided with heat exchangers 45 and 46, respectively, which are for cooling the fluidized adsorbent particles and gas, while the pipe 36 and the riser 35 are provided with heat exchangers 47 and 48, respectively, which are for heating the fluidized adsorbent particles and gas.

In the carbon dioxide gas adsorption system A where adsorption of carbon dioxide gas takes place, the temperature of the adsorbent present in the lower part of the pipe 33 than the heat exchanger 45 and in the riser 32 is maintained at 50° C. or lower, and the pressure in the riser 32 is maintained at from 1 to 2 atm. In the desorption system B, the temperature of the adsorbent present in the lower part of the pipe 36 than the heat exchanger 47 and in the riser 35 is maintained at from 100° to 350° C., preferably from 100° to 250° C., and the pressure in the cyclone 34 is regulated at from 20 to 760 mmHg (absolute pressure).

Because particles containing zeolite adsorbent in a fluidized state circulate from the cyclone 34 having a reduced pressure to the cyclone 31 having an elevated pressure, a high-density adsorbent bed (450 to 800 kg/m$^3$) is formed in the pipe 33 and a low-density adsorbent bed (50 to 200 kg/m$^3$) is formed in the riser 32. Due to a pressure difference between the two adsorbent bed heads, the desired pressure balance is maintained. The circulation of adsorbent particles from the cyclone 34 to the cyclone 31 for maintaining the pressure difference can be attained by constructing the unit so that the level difference between the lowest and highest parts of the pipe 33 is about from 10 to 30 m.

The dry raw gas fed through the piping 43 to the lower part of the pipe 33 functions as a fluidizing gas for fluidizing adsorbent particles. Although the carbon dioxide gas contained in the fluidizing gas is adsorbed onto the adsorbent, a part of the residual nitrogen leaks out to the cyclone 34 for recovering carbon dioxide gas. It is, therefore, preferred to reduce the amount of the fluidizing gas as much as possible in order to improve the purity of recovered carbon dioxide gas.

For reducing the amount of the fluidizing gas to thereby obtain recovered carbon dioxide gas with an improved purity, there is a method in which the raw gas fed as fluidizing gas is introduced into the pipe 33 under such conditions that the carbon dioxide gas contained in the raw gas is not adsorbed onto the adsorbent in the pipe 33. For example, the adsorption of carbon dioxide gas in the pipe 33 may be diminished by increasing the temperature of the adsorbent circulated from the cyclone 34 to the pipe 33 or by lowering the pressure in the pipe 33. Another possible method for improving recovered carbon dioxide gas purity is to introduce a part of recovered carbon dioxide gas as a fluidizing gas (through piping 49) under the same conditions as the above. Each expedient results in an increase of the energy required for carbon dioxide gas separation. However, since the purity of carbon dioxide gas and the required energy have trade-off relationship with each other, it is necessary to determine suitable conditions according to the purpose.

Even in the case where the carbon dioxide gas-containing gas (raw gas) fed through the piping 39 has been dried to a high degree, the amount of water adsorbed on the adsorbent being circulated increases to a considerable level during long-term use although the rate of the increase of adsorbed water amount is very low. If the raw gas has been dried insufficiently, the amount of water adsorbed on the adsorbent increases rapidly. In order to prevent such undesired water adsorption, the desorption system is regulated to have a temperature of 200° C. or more and a pressure of 50 mmHg or less, whereby the adsorbent can be dehydrated simultaneously with the desorption of carbon dioxide gas and the amount of water adsorbed on the adsorbent can be maintained extremely small without conducting adsorbent replacement in which the adsorbent is partly taken out and replaced with a fresh one. In the case where a raw gas having a high dew point is employed, the separation unit requires a larger amount of energy for dehydration, but the size of a drying unit and the amount of energy both required for the dehydration before the raw gas is introduced into the separation unit can be smaller. Therefore, for practical operations of the separation unit, the dew point of a raw gas at the inlet to the separation unit should be determined while the operation cost for the whole unit including the water content of the raw gas to be dried by a drying unit are taken in account.

Since the adsorbent separated from an off-gas in the cyclone 31 also contains nitrogen gas adsorbed thereon along with carbon dioxide gas, a part of recovered carbon dioxide gas is fed to the lower part of the pipe 36 by means of a compressor 50 and a piping 51 thereby to replace the adsorbed nitrogen gas with carbon dioxide gas. As a result, most of the gases adsorbed on the adsorbent present in the lower part of the pipe 36 becomes carbon dioxide gas.

Thus, the recycled carbon dioxide gas and the nitrogen gas released by replacement with carbon dioxide gas function as a fluidizing gas in the lower part and the upper part of the pipe 36, respectively, so that a good fluidized state can be obtained throughout the piping.

In the desorption system B, the adsorbent is heated by the heat exchangers 47 and 48 and, as it ascends in the riser 35, the adsorbent enters a lower-pressure part of the system. Due to the heat and reduced pressure, the carbon dioxide gas adsorbed on the adsorbent is desorbed substantially completely in the cyclone 34 and recovered by means of the pump 44 as described above. In this separation unit, a valve 38 is provided between the pipe 36 and the riser 35. Since the desorption of carbon dioxide gas begins when the adsorbent is still in the lower part of the riser 35 and the amount of the desorbed carbon dioxide gas increases as the adsorbent ascends through the riser 35, there is substantially no need of introducing a lifting gas through a piping 52. The adsorbent particles which have recovered their adsorbing ability by desorption are fed to the adsorption system A through the pipe 33 of the adsorption system.

Figure 10:
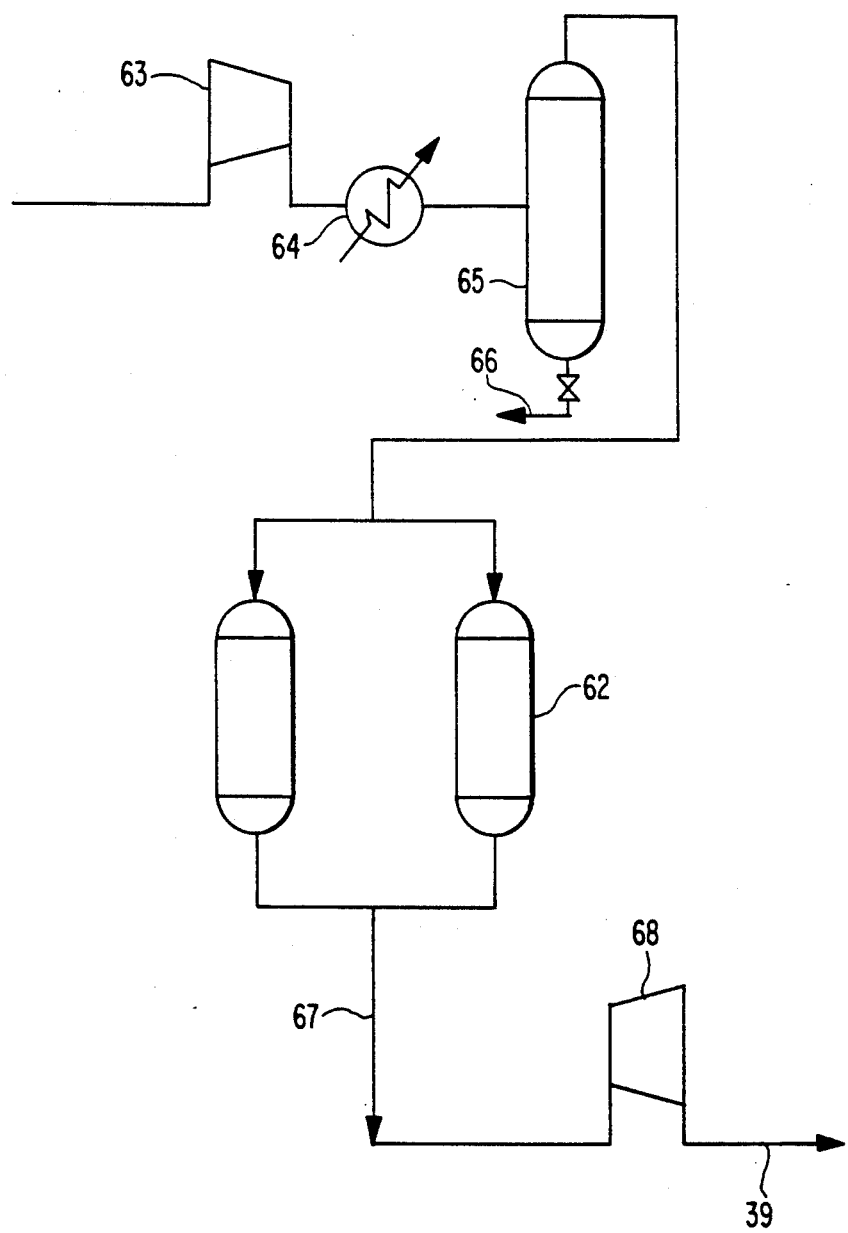
FIG. 10 is a diagrammatic view illustrating one example of the drying unit for the dehydration of a carbon dioxide gas-containing gas to be treated in the present invention.

FIG. 10 shows one embodiment of the drying unit for drying and dehydrating a carbon dioxide gas-containing gas to be treated in the present invention. This drying unit comprises a pressurerizing with cooling device 61 for drying a carbon dioxide gas-containing gas and a dehydrator 62 which employs a dehydrating adsorbent or water separation membrane for further dehydrating the resulting carbon dioxide gas-containing gas. A raw gas (carbon dioxide gas-containing gas) is first compressed with a compressor 63, cooled with a cooler 64, and then cooled and dried in a dehydration unit 65. The water thus removed from the raw gas is discharged through a piping 66. This compression and cooling operation removes from 80% to 90% of the water contained in the raw gas. The resulting carbon dioxide gas-containing gas is then dehydrated in dehydrating towers 62 packed with a dehydrating adsorbent, thereby to further remove water remaining in the gas. A water separation membrane may be used in place of the dehydrating towers 62 packed with a dehydrating adsorbent. The thus-dried carbon dioxide gas-containing gas is taken out through a piping 67. Since this dry gas usually has a pressure of from 2 to 10 atm, the pressure of the gas is reduced before the gas is fed to the carbon dioxide gas separation unit as described above. Use of an expander 68 for this pressure reduction is advantageous in that not only power recovery is possible but also the temperature of the gas can be lowered up to about $-60°$ C.; such a low gas temperature contributes to the adsorption and separation of carbon dioxide gas in the carbon dioxide gas separation unit. The dry gas is fed through a piping 39 and the piping 40 (FIG. 9) to the riser 32 extending to the cyclone 31 of the carbon dioxide gas adsorption system A in the carbon dioxide gas separation unit described above and also fed through the piping 43 to the pipe 33 (FIG. 9).

The drying unit for drying a carbon dioxide gas-containing gas to be treated in the present invention is not limited to the unit shown in FIG. 10, and any drying unit may be used as long as it can regulate a carbon dioxide gas-containing gas to have a desired dew point and can feed the dry gas at a temperature of 50° C. or less and a pressure of from 1 to 2 atm to the carbon dioxide gas separation unit.

As the zeolite adsorbent particles for use in the above embodiment of the present invention, any of the conventionally used various zeolite-type adsorbents may be employed, such as zeolite X, zeolite Y, zeolite A, and zeolite of the coal ash type as described in JP-A-64-24014. (The term "JP-A" as used herein means an "unexamined published Japanese patent application".) However, since the adsorbent is circulated in a fluidized state, it generally is in the form of spherical particles having an average particle diameter of from 30 to 150 μm. In order to heighten the efficiency of adsorption-desorption operation, it is preferred to use an adsorbent having a zeolite content of 20% by weight or more, more preferably 50% by weight or more. From the standpoint of attaining a prolonged adsorbent life, it is preferred to use an adsorbent having an attrition loss as measured by the jet flow method (as described in *Ryudosho Hannousouchi* (Fluidized Bed Reaction Unit), p. 32, edited by Kagaku Kogaku Kyokai, published by Kagaku Kogyo Sha, 1987) of 5% by weight or less per 15 hours, more preferably 2% by weight or less per 15 hours.

Examples of the properties of such an adsorbent are shown in Table 1 below.

TABLE 1

| | |
|---|---|
| Zeolite content | >60 wt % |
| Shape | spherical |
| Average particle diameter | 60–80 μm |
| Particle diameter distribution | |
| 0–20 μm | 2 wt % |
| 0–50 μm | 20–30 wt % |
| 0–150 μm | 100 wt % |
| Bulk density | 700–900 kg/m$^3$ |
| Angle of repose | <35° |
| Attrition loss | 2 wt %/15 hr |

Since in the carbon dioxide gas adsorption system A, 90% or more of the carbon dioxide gas contained in the raw gas is adsorbed onto the adsorbent, the off-gas discharged through the piping 41 is mostly nitrogen gas as shown in Table 2 given later.

A specific example of the carbon dioxide gas separation process according to the present invention is described in detail below with reference to FIG. 9, but the present invention is not construed as being limited thereto.

EXAMPLE

A carbon dioxide gas-containing gas (raw gas) (gas component flow G1) which had been dried to such a degree that the dew point of the gas was lowered to $-10°$ C. or less was fed from the piping 39 through the piping 40 to the riser 32 at a temperature of 50° C. and a pressure of 2.0 atm (absolute pressure) (gas component flow G2). The riser 32 had a height of 16 m and was constructed with a pipe having an inner diameter of 16 mm. The gas flow amount in the riser 32 was 2 m$^3$/hour. A part of the carbon dioxide gas-containing dry gas was fed, as a fluidizing gas, through the piping 43 to the lower part of the pipe 33 (gas component flow G3).

Before the raw gas reached the cyclone 31, carbon dioxide gas contained in the raw gas was adsorbed onto an adsorbent which is ascending in a fluidized state in the riser 32 (gas component flow G4).

The nitrogen gas remaining unadsorbed was discharged from the cyclone 31 (gas component flow G5). The adsorbent and carbon dioxide gas adsorbed thereon (gas component flow G6) was heated with the heat exchanger 47 disposed in the pipe 36 of the desorption system B. After purging nitrogen gas by the recycled carbon dioxide gas (gas component flow G11) which had been fed through the piping 51, the heated adsorbent was transferred to the lower part of the riser 35 and optionally mixed with a gas that was a part of recovered carbon dioxide gas and which had been fed through the piping 52 (gas component flow G7). In the resulting mixed gas flow (gas component flow G8), the adsorbed carbon dioxide gas was desorbed from the adsorbent. The desorbed carbon dioxide gas was recovered in the cyclone 34 (gas component flow G10). Thereafter, the regenerated adsorbent was circulated again to the adsorption system A through the pipe 33 (gas component flow G9). The desorption-part riser 35 had a height of 21 m and an inner diameter of 40 mm.

Part of the recovered carbon dioxide gas (gas component flow G12) was fed as a recycled carbon dioxide gas (gas component flow G11) to the lower part of the pipe 36 and the lower part of the riser 35 through the pipings 51 and 52, respectively.

Properties of each of the above gas component flows are shown in Table 2. The properties of the gas component flows included not only gases in a gaseous state but also gases adsorbed on the adsorbent. In this example, since recycled carbon dioxide gas was not fed through the piping 52, the composition of the gas component flow G7 was 0.0.

Properties of the zeolite adsorbent particles used above are given in Table 3.

TABLE 2

| | Gas Component Flow | | | | | | | | | | | |
|---|---|---|---|---|---|---|---|---|---|---|---|---|
| | G1 | G2 | G3 | G4 | G5 | G6 | G7 | G8 | G9 | G10 | G11 | G12 |
| Temperature (°C.) | 50 | 50 | 50 | 48 | 50 | 50 | | 205 | 200 | 200 | 200 | 200 |
| Pressure (atm)*$^1$ | 2.0 | 2.0 | 2.0 | 1.3 | 1.0 | 1.0 | | 1.0 | 0.03 | 0.03 | 2.0 | 1.0 |
| Yield or Fed Composition (mol %)*$^2$ | | | | | | | | | | | | |
| CO$_2$ (gas phase) | 14.0 | 6.3 | 7.7 | 7.7 | 1.2 | 0.0 | 0.0 | — | — | 24.5 | 11.6 | 12.9 |
| N$_2$ (gas phase) | 86.0 | 38.6 | 47.4 | 47.4 | 85.6 | 42.9 | 0.0 | — | — | 0.4 | 0.2 | 0.2 |
| CO$_2$ (adsorbed) | — | — | — | 7.6 | — | 14.1 | — | 25.7 | 1.3 | — | — | — |

TABLE 2-continued

|  | Gas Component Flow | | | | | | | | | | | |
| --- | --- | --- | --- | --- | --- | --- | --- | --- | --- | --- | --- | --- |
|  | G1 | G2 | G3 | G4 | G5 | G6 | G7 | G8 | G9 | G10 | G11 | G12 |
| $N_2$ (adsorbed) | — | — | — | 38.2 | — | 42.9 | — | 0.0 | 0.0 | — | — | — |

*[1] Absolute pressure
*[2] Based on the total fed amount

TABLE 3

| Zeolite type | 13× |
| --- | --- |
| Zeolite content | 33 wt % |
| Average particle diameter | 72 μm |
| Particle diameter distribution | same as in Table 1 |
| Bulk density | 750 kg/m³ |
| Angle of repose | 30° |
| Attrition loss | 2 wt %/15 hr |

According to the process and unit of the present invention, the following effects can be produced:

(1) Since an adsorption-desorption operation is conducted in a system in which fluidized adsorbent particles circulate, a large gas-treating capacity is obtained and a large amount of gas can be treated continuously. In particular, by changing the pipe diameter of the circuit through which fluidized adsorbent particles circulate, the process and unit can be made capable of treating a larger amount of gas.

(2) The largest possible difference in gas adsorbability due to a difference in pressure between adsorption and desorption can be utilized in the circulation of fluidized adsorbent particles and, if required and necessary, a gas adsorbability difference due to a temperature difference can also be utilized. Therefore, the treating capacity of the process and unit can be increased further. In particular, in the case where the desorption system is regulated to have a reduced pressure lower than atmospheric pressure, the largest possible difference in gas adsorbability due to a pressure difference can be utilized more effectively and a higher separation efficiency can be attained.

(3) Because the pressure loss due to the particle bed within the system is small, the power required for operating the unit is low as compared with PSA processes of the batch type.

(4) Since the main parts of the unit can be constructed by pipes or the like, the heating, cooling, and heat exchange of fluids can be conducted efficiently and, hence, an adsorption-desorption operation based on temperature change can be performed effectively.

(5) An increase or reduction of the amount of gas to be treated can be coped by increasing or reducing the diameter of pipes to be employed in the unit, so that the unit can be scaled up with great ease. Therefore, the process and unit of the present invention is applicable to various gases including exhaust gases discharged from small-sized boilers and gases discharged in large quantities such as effluent gases from cement factories and exhaust gases from thermal power stations. Accordingly, the process of the present invention is extremely suited as a means for environmental protection.

While the invention has been described in detail and with reference to specific embodiments thereof, it will be apparent to one skilled in the art that various changes and modifications can be made therein without departing from the spirit and scope thereof.

What is claimed is:

1. A gas separation process which comprises the steps of:

introducing a gas consisting of two or more components into an adsorption system in which adsorbent particles circulate in a fluidized state, thereby to allow, at atmospheric pressure or an elevated pressure, said adsorbent particles to adsorb a gas component to be separated from the gas;

transferring sad adsorbent particles adsorbing said gas component to a desorption system;

desorbing said gas component from said adsorbent particles in said desorption system which is regulated to have either a lower pressure or a lower pressure and a higher temperature than said adsorption system; and then introducing part of the desorbed gas component into a line for transferring said adsorbent particles from said adsorption system to said desorption system, in a direction opposite to the direction of the adsorbent particles.

2. A process as claimed in claim 1, wherein the pressure in said desorption system is a reduced pressure.

3. A process as claimed in claim 1, wherein the difference between the maximum pressure in the adsorption system and the minimum pressure in said desorption system is from 200 mmHg to 2 atm.

4. A process as claimed in claim 1, wherein said adsorbent particles provide a separation factor of 3 or more for the gas component to be separated by adsorption with respect to the other gas component(s).

5. A process for separating carbon dioxide gas which comprises the steps of:

introducing a carbon dioxide gas-containing gas into a system in which adsorbent particles circulate in a fluidized state, thereby to allow said adsorbent particles to adsorb carbon dioxide gas at a pressure of from 1 to 2 atm;

separating the residual gas remaining unadsorbed from said adsorbent particles;

desorbing said carbon dioxide gas from said adsorbent particles at a pressure of from 20 to 760 mmHg; and then introducing part of the desorbed carbon dioxide gas into a line for transferring said adsorbent particles from said adsorption system to said desorption system, in a direction opposite to the direction of the adsorbent particles.

6. A process as claimed in claim 5, wherein the adsorbent is a zeolite adsorbent, the adsorption of carbon dioxide gas onto said adsorbent is conducted at a temperature of 50° C. or less and a pressure of from 1 to 2 atm, and the desorption of said carbon dioxide gas from said adsorbent is conducted at a temperature of from 100° to 350° C.

7. A gas separation unit for separating a gas component from a gas consisting of two or more components, said unit comprising a gas adsorption system and a gas desorption system, said gas adsorption system comprising an adsorption part into which a gas consisting of two or more components is introduced and in which adsorbent particles move in a fluidized state; a cyclone which has been connected with said adsorption part and into which said gas and said adsorbent particles flow for separation; a transfer piping for sending said adsorbent particles from said cyclone to a desorption part of said gas desorption system; and a discharge piping provided in said cyclone and for discharging a residual gas that has undergone adsorption treatment, said gas desorption system comprising a desorption part which is regulated to have a lower pressure than said adsorption part and in which said adsorbent particles move in a fluidized state; a cyclone which has been connected with said desorption part and into which a desorbed gas and said adsorbent particles flow; a transfer piping for sending said adsorbent particles thus-regenerated from said cyclone to said adsorption part; a discharge piping provided in said cyclone and for discharging said separated gas; and a piping provided in said discharge piping and for feeding part of said separated gas to a lower area of said adsorption part in a direction opposite to the direction of the adsorbent particles.

8. A unit as claimed in claim 7, wherein said gas consisting of two or more components is a carbon dioxide gas-containing gas, said gas component to be separated is carbon dioxide gas, and said adsorbent particles are zeolite adsorbent particles.

9. A unit as claimed in claim 8, wherein the level difference between the highest and the lowest parts of said transfer piping for transferring adsorbent particles from said cyclone in said desorption system to said adsorption part is from 10 to 30 m, and said adsorption part contains a high-density adsorbent bed in which the bulk density of zeolite adsorbent particles is from 450 to 800 kg/m$^3$ and a low-density adsorbent bed in which the bulk density of zeolite adsorbent particles is from 50 to 200 kg/m$^3$.

10. A unit as claimed in claim 8, wherein said zeolite adsorbent particles have a zeolite content of 20% by weight or more and an attrition loss of 5% by weight or less per 15 hours.

* * * * *